US009049098B2

(12) United States Patent
Guichard et al.

(10) Patent No.: US 9,049,098 B2
(45) Date of Patent: *Jun. 2, 2015

(54) DISCOVERY OF SERVICES PROVIDED BY APPLICATION NODES IN A NETWORK

(75) Inventors: Jim Guichard, New Boston, NH (US); David Delano Ward, Somerset, WI (US); Cedell Adam Alexander, Jr., Durham, NC (US); Carlos M. Pignataro, Raleigh, NC (US)

(73) Assignee: Cisco Technology, Inc., San Jose, CA (US)

( * ) Notice: Subject to any disclaimer, the term of this patent is extended or adjusted under 35 U.S.C. 154(b) by 621 days.

This patent is subject to a terminal disclaimer.

(21) Appl. No.: 12/850,841

(22) Filed: Aug. 5, 2010

(65) Prior Publication Data

US 2012/0033663 A1 Feb. 9, 2012

(51) Int. Cl.
*H04L 12/751* (2013.01)
*H04L 12/723* (2013.01)
*H04L 12/725* (2013.01)
*H04L 12/46* (2006.01)

(52) U.S. Cl.
CPC .............. *H04L 45/02* (2013.01); *H04L 45/507* (2013.01); *H04L 12/4633* (2013.01); *H04L 45/306* (2013.01)

(58) Field of Classification Search
CPC ...................................................... H04L 45/02
USPC ....................... 370/329, 341, 431, 437, 395.2; 709/203, 202, 204, 206, 217, 219, 230
See application file for complete search history.

(56) References Cited

U.S. PATENT DOCUMENTS

| | | | |
|---|---|---|---|
| 7,243,155 B2* | 7/2007 | Bou-Ghannam et al. | 709/230 |
| 7,254,136 B1* | 8/2007 | Gunter et al. | 370/401 |
| 7,711,780 B1* | 5/2010 | Durand et al. | 709/206 |
| 7,742,431 B2* | 6/2010 | Ng et al. | 370/254 |
| 7,860,100 B2 | 12/2010 | Khalid et al. | |
| 8,345,682 B2 | 1/2013 | Pignataro et al. | |
| 8,467,411 B1* | 6/2013 | Minei et al. | 370/467 |
| 8,582,469 B2* | 11/2013 | Rosenberg | 370/254 |
| 2002/0143944 A1* | 10/2002 | Traversat et al. | 709/225 |
| 2002/0159463 A1* | 10/2002 | Wang | 370/401 |
| 2003/0084177 A1* | 5/2003 | Mulligan | 709/230 |
| 2006/0159068 A1* | 7/2006 | Lundan | 370/352 |
| 2007/0237147 A1 | 10/2007 | Quinn et al. | |
| 2007/0258387 A1* | 11/2007 | Patel et al. | 370/254 |
| 2008/0198849 A1 | 8/2008 | Guichard et al. | |
| 2008/0320303 A1 | 12/2008 | Khalid et al. | |
| 2009/0037713 A1 | 2/2009 | Khalid et al. | |
| 2010/0058329 A1 | 3/2010 | Durazzo et al. | |

(Continued)

*Primary Examiner* — Hassan Phillips
*Assistant Examiner* — Saba Tsegaye
(74) *Attorney, Agent, or Firm* — The Law Office of Kirk D. Williams

(57) ABSTRACT

An application node advertises service(s), using a routing protocol, that it offers to other network nodes. For example, the routing protocol used to advertise service(s) in a Service Provider Network is typically an link-state, Interior Gateway Protocol (IGP), such as, but not limited to, Intermediate System to Intermediate System (IS-IS) or Open Shortest Path First (OSPF). Packets are encapsulated and sent from a service node (e.g., packet switching device) using one or more advertised services applied to a packet by an application node (e.g., a packet switching device and/or computing platform such as a Cisco ASR 1000).

30 Claims, 8 Drawing Sheets

(56) References Cited

U.S. PATENT DOCUMENTS

2010/0061301 A1*  3/2010  Antal et al. .................. 370/328
2010/0165985 A1   7/2010  Sharma et al.
2010/0191595 A1*  7/2010  Graves et al. ............. 705/14.36
2010/0254385 A1  10/2010  Sharma et al.
2012/0002672 A1   1/2012  Alexander, Jr. et al.
2012/0026897 A1   2/2012  Guichard et al.
2012/0027016 A1   2/2012  Filsfils et al.
2012/0033664 A1   2/2012  Pignataro et al.

* cited by examiner

DISCOVERY OF SERVICES PROVIDED BY APPLICATION NODES IN A NETWORK

TECHNICAL FIELD

The present disclosure relates generally to communicating information in a network.

BACKGROUND

The communications industry is rapidly changing to adjust to emerging technologies and ever increasing customer demand. This customer demand for new applications and increased performance of existing applications is driving communications network and system providers to employ networks and systems having greater speed and capacity (e.g., greater bandwidth). In trying to achieve these goals, a common approach taken by many communications providers is to use packet switching technology.

Layer-4 to layer-7 services are often applied to packets being sent through a packet switching device. Service Insertion Architecture teaches one approach to providing network services outside the packet switching device.

BRIEF DESCRIPTION OF THE DRAWINGS

The appended claims set forth the features of one or more embodiments with particularity. The embodiment(s), together with its advantages, may be best understood from the following detailed description taken in conjunction with the accompanying drawings of which:

DESCRIPTION OF EXAMPLE EMBODIMENTS

1. Overview

Figure 1A:
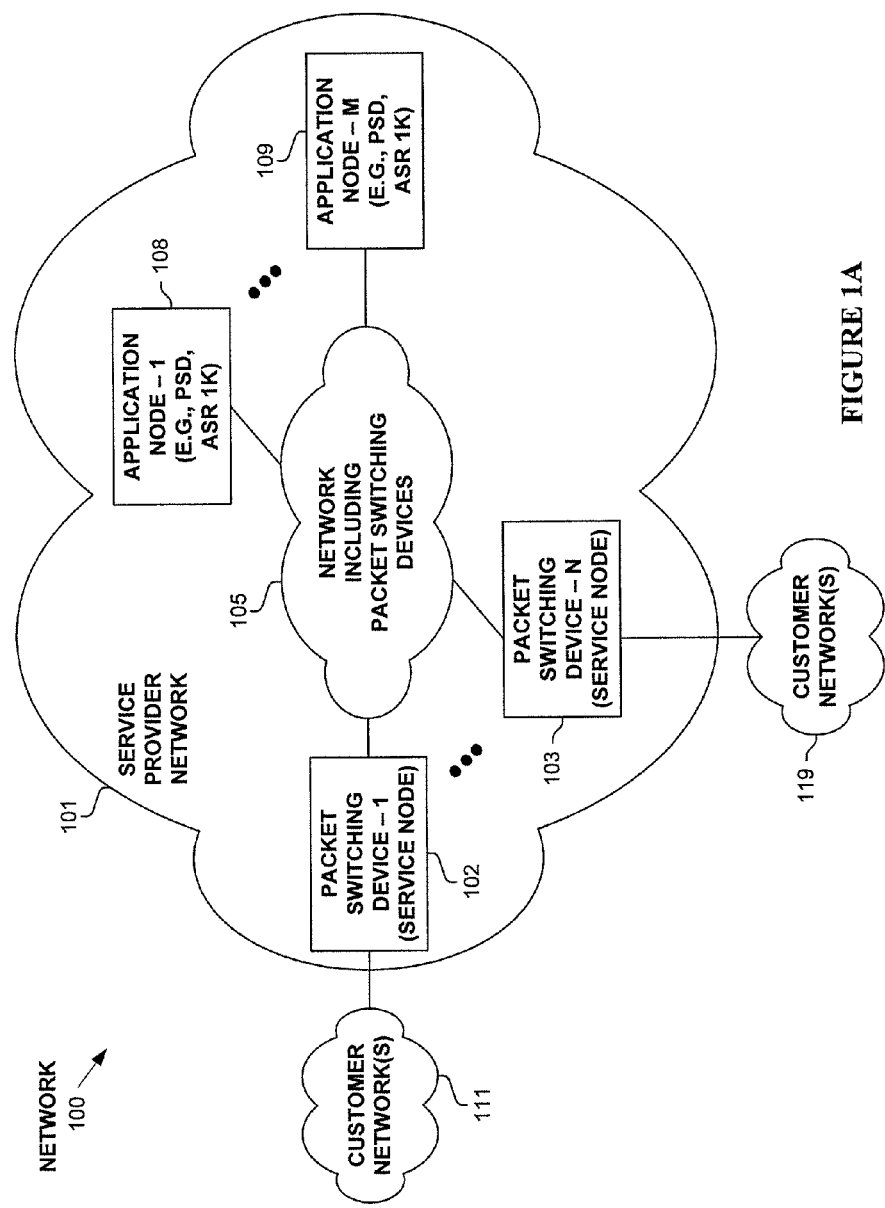
FIG. 1A illustrates a network operating according to one embodiment.

Disclosed are, inter alia, methods, apparatus, computer-storage media, mechanisms, and means associated with an application node (e.g., a packet switching device and/or computing platform such as a Cisco ASR 1000) advertising, using a routing protocol, services that it offers to other network nodes. In one embodiment, the routing protocol used is a link-state routing protocol. In one embodiment, the routing protocol is an Internal Gateway Protocol (IGP). Other application nodes or service nodes (e.g., packet switching devices) thus discover the capability of the application node, and can send packets to the application node for application of its services to its packets.

One embodiment includes a method performed, with the method comprising: advertising via a routing protocol, by an application node, a service that the application node is configured to perform; receiving, by a packet switching device, one or more packets including information being distributed via the routing protocol, with said one or more packets including an advertisement that the service is available from the application node; selecting the application node to apply the service based on the advertisement that the service is available from the application node; sending, by a first packet switching device, a request packet to the application node to apply the service to a representation of a packet; and applying, by the application node, the service to the representation of the packet.

Examples of these services applied to packets in one embodiment include at least one application from a group of applications consisting of: layer-4, layer-5, layer-6, and layer-7 services. In one embodiment, the service includes at least one application from a group of applications consisting of: Firewall (FW), Network Address Translation (NAT), Network-based Application Recognition (NBAR), deep packet inspection (DPI), authentication, encryption, and Internet Protocol Security (IPsec). In one embodiment, a service might include multiple services/applications applied by one or more application nodes (which may be referred to as a single service including multiple services/applications, or multiple services/applications). Additionally, in one embodiment, a service node, or application node as part of a service which includes multiple applications/services applied by multiple application nodes, might provide parameters or attributes to refine the service being advertised, with these parameters or attributes possibly being communicated to an application node prior to applying a service to a packet, or possibly included with the packet to which the service is to be applied. For example, a generalized deep packet inspection service will need to be configured for what pattern or signature to locate. In one embodiment, an application node might advertise a specific service which may not require such parameters or arguments; for example, a deep packet inspection service configured to look for a particular pattern or signature.

In one embodiment, the routing protocol used to advertise service(s) is a link-state, Interior Gateway Protocol (IGP), such as, but not limited to, Intermediate System to Intermediate System (IS-IS) or Open Shortest Path First (OSPF). In one embodiment, this advertisement is encoded in an IS-IS GENINFO type-length-value element (TLV). In one embodiment, this advertisement is encoded in an OSPF Opaque Link State Advertisement (LSA) or Transport Instance.

In one embodiment, the request packet includes a service identifier; wherein the application node uses the service identifier to determine to apply the service to the representation of the packet. In one embodiment, the advertisement that the service is available from the application node includes an identification of a service identifier. In one embodiment, the service identifier is assigned by the application node. In one embodiment, said advertising by the application node includes an identification of one or more supported transport types for the service. In one embodiment, the packet switching device said receives said one or more packets including information being distributed via the routing protocol from a second packet switching device different from the packet switching device and the application node.

2. Description

Disclosed are, inter alia, methods, apparatus, computer-storage media, mechanisms, and means associated with an application node (e.g., a packet switching device and/or computing platform such as a Cisco ASR 1000) advertising, using a routing protocol, services that it offers to other network nodes. In one embodiment, the routing protocol used is a link-state routing protocol. In one embodiment, the routing protocol is an Internal Gateway Protocol (IGP). Other application nodes or service nodes (e.g., packet switching devices) thus discover the capability of the application node, and can send packets to the application node for application of its services to its packets.

Note, a particular packet having one or more services applied to it by an application node is referred to herein as a services-applied packet, regardless of whether the application of the service(s) resulted in the same particular packet, a modified particular packet, or a different packet. Further, "ServiceWire" is a term used herein to refer to the technology (e.g., equipment, methods, protocols) used in communicating packets to and/or among one or more remote application node(s), the application of one or more services to a packet, and possibly the sending of the services-applied packet and/or other results to a ServiceWire-capable service node. For example, the packet encapsulation or information sent between service node(s) and/or application node(s) might be referred to as ServiceWire encapsulation or ServiceWire attributes.

Embodiments described herein include various elements and limitations, with no one element or limitation contemplated as being a critical element or limitation. Each of the claims individually recites an aspect of the embodiment in its entirety. Moreover, some embodiments described may include, but are not limited to, inter alia, systems, networks, integrated circuit chips, embedded processors, ASICs, methods, and computer-readable media containing instructions. One or multiple systems, devices, components, etc. may comprise one or more embodiments, which may include some elements or limitations of a claim being performed by the same or different systems, devices, components, etc. A processing element may be a general processor, task-specific processor, or other implementation for performing the corresponding processing. The embodiments described hereinafter embody various aspects and configurations, with the figures illustrating exemplary and non-limiting configurations. Note, computer-readable media and means for performing methods and processing block operations (e.g., a processor and memory or other apparatus configured to perform such operations) are disclosed and are in keeping with the extensible scope and spirit of the embodiments. Note, the term "apparatus" is used consistently herein with its common definition of an appliance or device. The term "packet" refers to a data packet or frame, such as, but not limited to, an Internet Protocol (IP) packet or Ethernet frame; and the format of a packet includes at least a packet header and payload.

Note, the steps, connections, and processing of signals and information illustrated in the figures, including, but not limited to, any block and flow diagrams and message sequence charts, may typically be performed in the same or in a different serial or parallel ordering and/or by different components and/or processes, threads, etc., and/or over different connections and be combined with other functions in other embodiments, unless this disables the embodiment or a sequence is explicitly or implicitly required (e.g., for a sequence of read the value, process said read value—the value must be obtained prior to processing it, although some of the associated processing may be performed prior to, concurrently with, and/or after the read operation). Also note, nothing described or referenced in this document is admitted as prior art to this application unless explicitly so stated.

The term "one embodiment" is used herein to reference a particular embodiment, wherein each reference to "one embodiment" may refer to a different embodiment, and the use of the term repeatedly herein in describing associated features, elements and/or limitations does not establish a cumulative set of associated features, elements and/or limitations that each and every embodiment must include, although an embodiment typically may include all these features, elements and/or limitations. In addition, the terms "first," "second," etc. are typically used herein to denote different units (e.g., a first element, a second element). The use of these terms herein does not necessarily connote an ordering such as one unit or event occurring or coming before another, but rather provides a mechanism to distinguish between particular units. Moreover, the phrases "based on x" and "in response to x" are used to indicate a minimum set of items "x" from which something is derived or caused, wherein "x" is extensible and does not necessarily describe a complete list of items on which the operation is performed, etc. Additionally, the phrase "coupled to" is used to indicate some level of direct or indirect connection between two elements or devices, with the coupling device or devices modifying or not modifying the coupled signal or communicated information. Moreover, the teem "or" is used herein to identify a selection of one or more, including all, of the conjunctive items. Additionally, the transitional term "comprising," which is synonymous with "including," "containing," or "characterized by," is inclusive or open-ended and does not exclude additional, unrecited elements or method steps. Finally, the term "particular machine," when recited in a method claim for performing steps, refers to a particular machine within the 35 USC §101 machine statutory class.

Disclosed are, inter alia, methods, apparatus, computer-storage media, mechanisms, and means associated with an application node (e.g., a packet switching device and/or computing platform such as a Cisco ASR 1000) advertising, using a routing protocol, services that it offers to other network nodes. In one embodiment, the routing protocol used is a link-state routing protocol. In one embodiment, the routing protocol is an Internal Gateway Protocol (IGP). Other application nodes or service nodes (e.g., packet switching devices) thus discover the capability of the application node, and can send packets to the application node for application of its services to its packets.

Expressly turning to the figures, FIG. 1A illustrates network 100 operating according to one embodiment, wherein a service node (e.g., edge packet switching device 102-103) sends a packet to an application node (108-109) for performing one or more services to the packet by one or more application nodes (108-109). Network 100 illustrates a typical configuration of a service provider network 101, which has edge packet switching devices 102-103 communicatively coupled to customer networks 111-119; and within service provider network 101, service provider nodes 102-103 and 108-109 are communicatively coupled (105).

Note, one embodiment performs the operations of advertising services and sending packets to application node(s) for applying service(s) in one or more networks different than network 100; and one embodiment performs the operations of advertising services and receiving packets by application node(s) for applying service(s) in one or more networks different than network 100.

As illustrated in FIG. 1A, application nodes 108-109 are configured for advertising their services via a routing protocol, such as, but not limited to, a link an Interior Gateway Protocol (e.g., IS-IS, OSPF). Packet switching devices 102-103 and 108-109 are configured to receive these advertisements, with this information being collected and distributed to other packet switching devices 102-103 and 108-109 according to the routing protocol.

Additionally, packet switching devices 102-103 ("service nodes") are configured for sending packets to one or more application nodes 108-109 for applying one or more discovered services to these packets. Thus, in one embodiment, packet switching devices 102-103 are not required to be able to perform such service(s). This allows the development of new packet services which are performed by an application node 108-109, without having to integrate into a packet switching device 102-103 (which would typically be more costly in terms of development and testing). Examples of these services applied to packets in one embodiment include layer-4, layer-5, layer-6, and/or layer-7 services, such as, but not limited to, Firewall (FW), Network Address Translation (NAT), Network-based Application Recognition (NBAR), deep packet inspection (DPI), authentication, encryption, and Internet Protocol Security (IPsec). In one embodiment, a packet that has had services applied to it by an application node 108-109 is returned to the service node 102-103 that originally sent the packet to the application node 108-109.

Further, it is possible for an application node (108-109) to apply services to one or more of the packets in a packet flow in order to generate a result, with this result used by a packet switching device (102-103) in processing these and/or other packets in the packet flow. Thus, in one embodiment, only one or possibly a few packets of a flow (e.g., some, but not all packets) are sent to an application node (108-109) to generate a result or results, with these result(s) used in processing other packets in the packet flow.

In one embodiment, the services applied to a packet include a classification service to classify the packet, possibly using deep packet inspection (DPI), such as, but not limited to, analyzing the payload of the particular packet, and/or analyzing information, extracted from the packet, corresponding to at least one or more of Open System Interconnect (OSI) layer from the group consisting of layer 5, layer 6 and layer 7. In one embodiment, this classification result is used in processing other packets in a flow of packets to which the classified packet belongs. In one embodiment, this classification or other processing result is used in applying Quality of Service (QoS) to one or more packets of the corresponding packet flow.

Figure 1B:
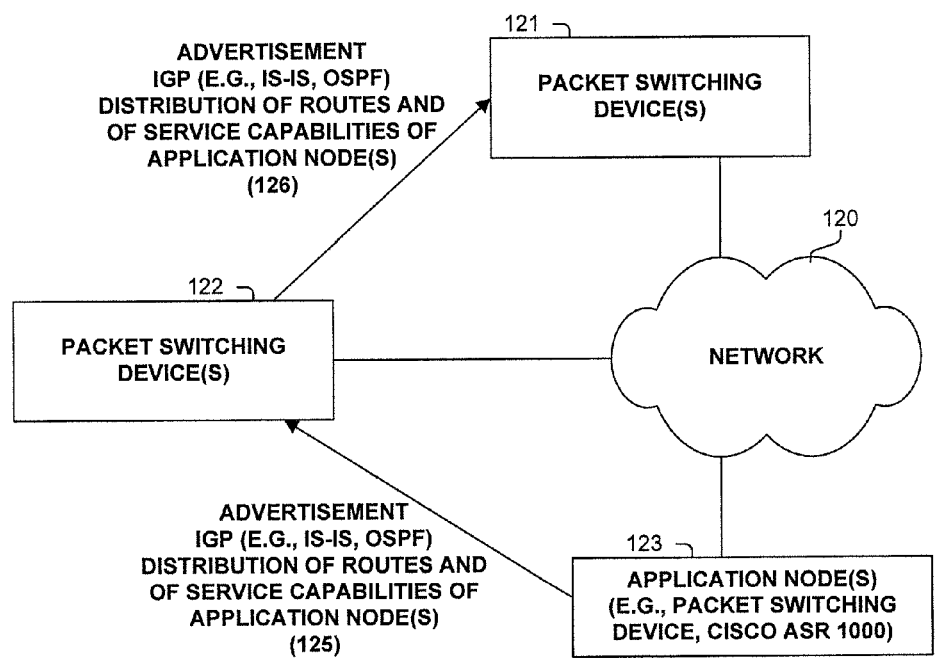
FIG. 1B illustrates a network operating according to one embodiment.

FIG. 1B is a generalized configuration of one embodiment illustrating the distribution and discovery of services that application node(s) 123 are capable of applying to packets. In one embodiment, application node(s) 123 advertise (125) their services (and typically also routing information) using a routing protocol, such as, but not limited to, an Interior Gateway Protocol (IGP) (e.g., IS-IS, OSPF) to packet switching device(s) 122 (which can be configured as a service or application node in one embodiment). According to the routing protocol, packet switching device(s) 122 further advertise (126) these services and routing information to other packet switching device(s) 121. Thus, advertising of services by an application node can be directly communicated to a packet switching device (122), or indirectly to a packet switching device (121) (e.g., via another one or more packet switching devices).

Figure 1C:
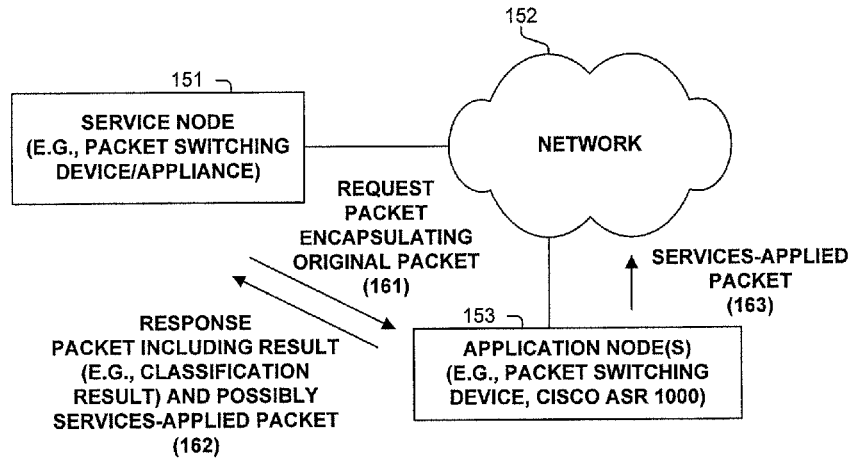
FIG. 1C illustrates a network operating according to one embodiment.

Next, shown in FIG. 1C is a generalized configuration of one embodiment including service node 151 (e.g., packet switching device/appliance), application node(s) 153 (e.g., packet switching device/appliance such as, but not limited to, a Cisco ASR 1000), communicatively coupled via network 152. As shown, service node 151 sends a request packet (161) encapsulating an original packet to application node(s) 153, which applies one or more services to the original packet to possibly determine a result (e.g., classification or other result) and resulting in a services-applied packet. In one embodiment, a response packet is sent (162) from application node(s) 153 to originating service node 151, with the response packet including the determined result, and possibly the encapsulated services-applied packet (e.g., the result of one or more services being applied to the original packet, which is typically the same, or a modification of, the original packet). In one embodiment, the services-applied packet is sent (163) into network 152, such as to another packet switching device towards its destination.

Figure 1D:
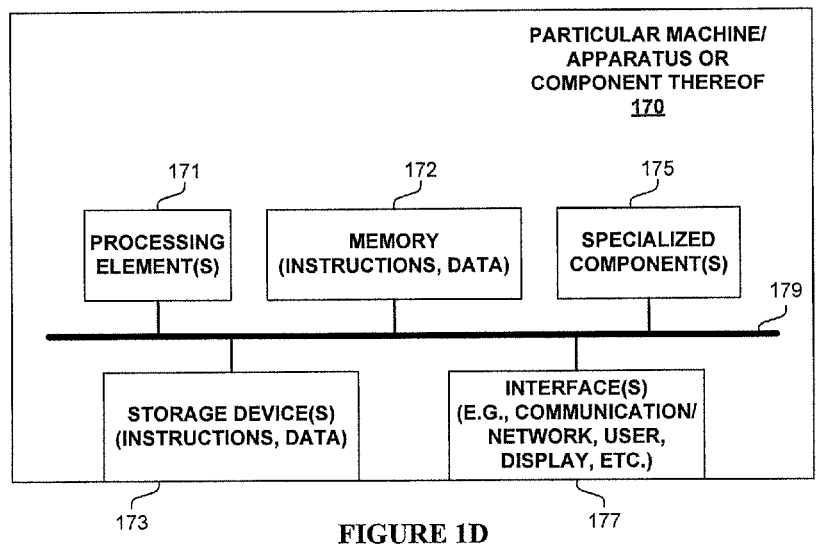
FIG. 1D illustrates an apparatus or component used in one embodiment.

FIG. 1D is a block diagram of an apparatus or component 170 used in one embodiment associated with a service node (e.g., packet switching device) using one or more services applied to packets by an application node (e.g., a packet switching device and/or computing platform). In one embodiment, apparatus or component 170 performs one or more processes corresponding to one of the flow diagrams illustrated or otherwise described herein.

In one embodiment, apparatus or component 170 includes one or more processing element(s) 171, memory 172, storage device(s) 173, specialized component(s) 175 (e.g. optimized hardware such as for performing operations, etc.), and interface(s) 177 for communicating information (e.g., sending and receiving packets, user-interfaces, displaying information, etc.), which are typically communicatively coupled via one or more communications mechanisms 179, with the communications paths typically tailored to meet the needs of the application. In one embodiment apparatus or component 170 corresponds to, or is part of, a service or application node illustrated in one of the other figures or otherwise described herein.

Various embodiments of apparatus or component 170 may include more or less elements. The operation of apparatus or component 170 is typically controlled by processing element(s) 171 using memory 172 and storage device(s) 173 to perform one or more tasks or processes. Memory 172 is one type of computer-readable/computer-storage medium, and typically comprises random access memory (RAM), read only memory (ROM), flash memory, integrated circuits, and/or other memory components. Memory 172 typically stores computer-executable instructions to be executed by processing element(s) 171 and/or data which is manipulated by processing element(s) 171 for implementing functionality in accordance with an embodiment. Storage device(s) 173 are another type of computer-readable medium, and typically comprise solid state storage media, disk drives, diskettes, networked services, tape drives, and other storage devices. Storage device(s) 173 typically store computer-executable instructions to be executed by processing element(s) 171 and/or data which is manipulated by processing element(s) 171 for implementing functionality in accordance with an embodiment.

Figure 2:
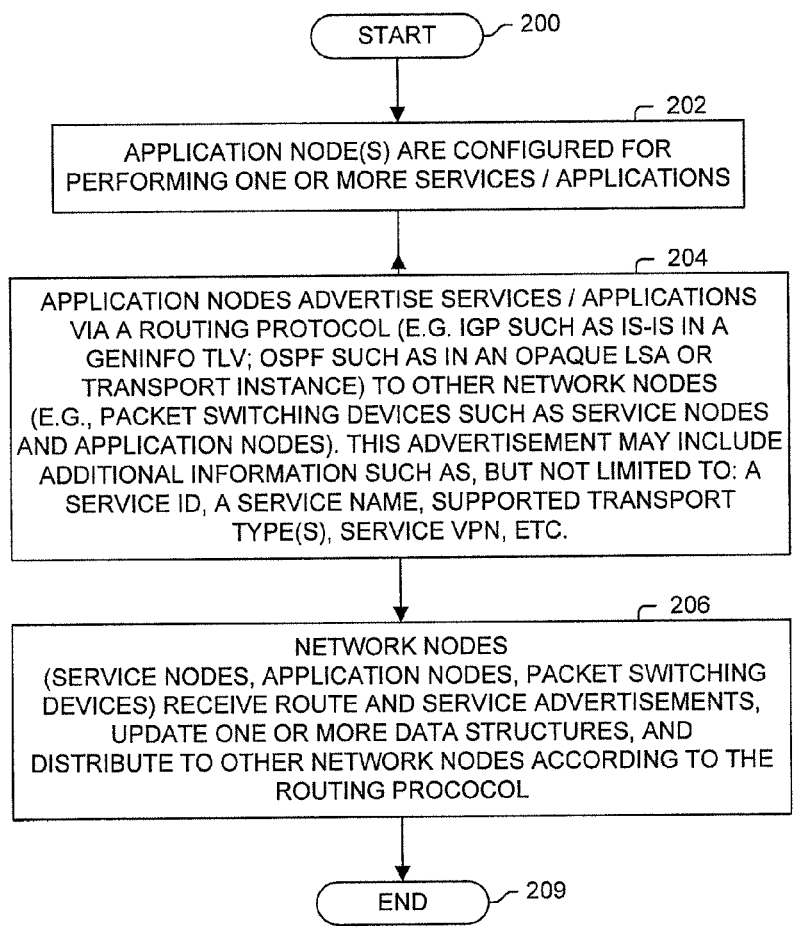
FIG. 2 illustrates a process performed in one embodiment.

FIG. 2 illustrates a process performed in one embodiment. Processing begins with process block 200. In process block 202, one or more application nodes are configured for performing one or more services/applications. Examples of these service applied to packets in one embodiment includes at least one application from a group of applications consisting of: layer-4, layer-5, layer-6, and layer-7 services. In one embodiment, the service includes at least one application from a group of applications consisting of: Firewall (FW), Network Address Translation (NAT), Network-based Application Recognition (NBAR), deep packet inspection (DPI), authentication, encryption, and Internet Protocol Security (IPsec). In one embodiment, a service might include multiple services/applications applied by one or more application nodes (which may be referred to as a single service including multiple services/applications, or multiple services/applications).

Additionally, in one embodiment, a service node, or application node (e.g., configuring another application node as part of a service which includes multiple applications/services applied by multiple application nodes), might provide parameters or attributes to refine an advertised service to be performed by a particular application node. These parameters or attributes may be communicated to an application node prior to applying a service to a packet, or possibly be included with the packet to which the service is to be applied. For example, a generalized deep packet inspection service will need to be configured for what pattern or signature to locate. In one embodiment, an application node might advertise a specific service which may not require such parameters or arguments; for example, a deep packet inspection service configured to look for a particular pattern or signature.

In process block 204, application node(s) advertise their services/applications via a routing protocol, such as, but not limited to, an Interior Gateway Protocol (IGP) to other network nodes (e.g., packet switching devices, which includes service node(s) and possibly application node(s)). In one embodiment, OSPF is used, such as with, but not limited to, the service advertisement included in an Opaque Link State Advertisement (LSA) or Transport Instance. For example, in one embodiment using OSPFv2, the service advertisement is included in a Transport Instance plus an Opaque LSA. For example, in one embodiment using OSPFv3, the service advertisement is included in a Transport Instance with a new LSA type code (e.g., a ServiceWire function code)

In one embodiment IS-IS is used, such as with, but not limited to, the service advertisement included in a GENINFO type-length-value element (TLV). The format of the GENINFO TLV used in one embodiment is as follows:

Type SERVICE_WIRE TYPE;
Length; and
Value:
  flags,
  Application ID,
  Application IP Address, and
  Application specific information.

The flags within the TLV are set to indicate routing domain scope, as well as whether the Application IP address is an IPv4 address or an IPv6 address. One embodiment uses an Application ID value representing the "ServiceWire" application. The IP address is set to an IP address reachable at the advertising service node, whether IPv4 or IPv6.

One embodiment uses an application specific sub-TLV which is carried within the "Application Specification Information" of the GETINFO TLV. This sub-TLV identifies a particular service available at the service node/appliance. The length of this sub-TLV is variable and equates to the length of the service name plus the size of (fixed fields). The format of the value field of this sub-TLV used in one embodiment is follows:

Service ID (24 bits): identifies service to be executed;
Service Name (variable): string representing name of the service (e.g. NAT, inside-to-outside NAT) which can be used to identify the type of service supported; and
Supported Transport type (16 bits): a bitmask representing the supported transport types for this particular service. The format of the bitmask is as follows:
  bit 0—MPLS RSVP/TE,
  bit 1—Native Ethernet, and
  bit 2—Pseudowire; and
Service VPN-id (32 bits)—used to carry the VPN-id used by the service node for this service. This enables the service node to offer the same service but in a VPN context where "Service-id/service vpn-id" represents the service instance for a given VPN subscriber.

Of course, other formats and encodings can be used in one embodiment.

Next, in process block 206, network nodes receive route and service advertisements, update their data structure(s), and distribute this information according to the routing protocol. Processing of the flow diagram of FIG. 2 is complete as indicated by process block 209.

Figure 3A:
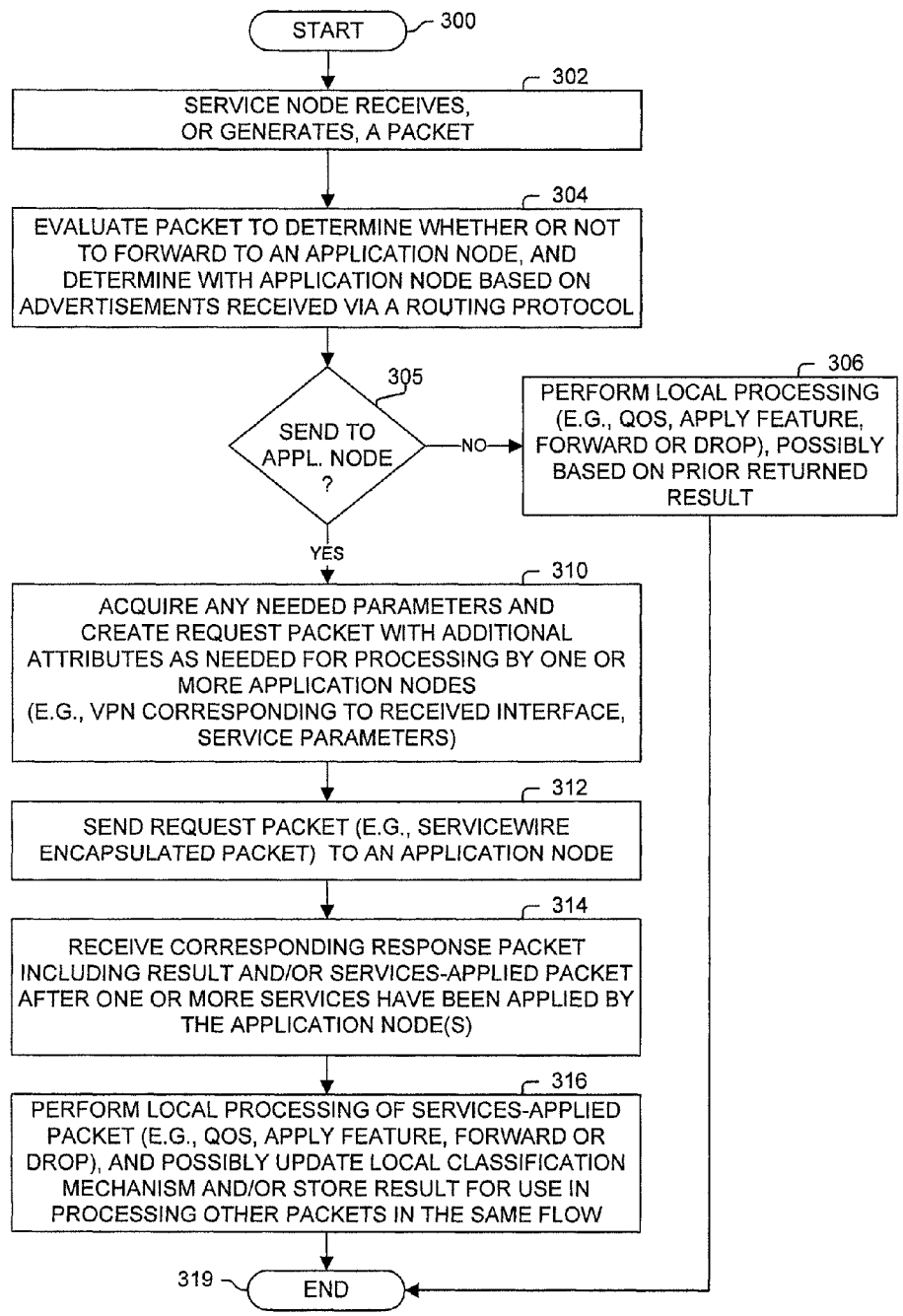
FIG. 3A illustrates a process performed in one embodiment.

FIG. 3A illustrates a process performed in one embodiment by a service node, such as, but not limited to, a packet switching device. Processing begins with process block 300. In process block 302, the service node receives or generates a packet. For example, the packet may be generated by the service node itself, or even by processing of another packet. In process block 304 (assuming it is not already known that the packet should be sent to an application node, e.g., based on a generated packet or all packets being sent to an application node), the packet is evaluated to determine whether or not it should be sent to an application node, as well as to determine which application node based on advertisement(s) received via a routing protocol, such as, but not limited to, an Interior Gateway Protocol (IGP).

Process block 305 identifies whether or not to send the packet to an application node. In one embodiment, a packet classification mechanism (e.g., binary or ternary content-addressable memory, lookup engine) is used to determine whether or not to forward the packet to an application node, as well as to determine which application node(s) to use for applying the service. One embodiment identifies the service based on the Service Name, and includes the service ID in a request packet sent to an application node for performing the corresponding service on a packet.

In one embodiment, this classification mechanism is updated in response to a result returned from an application node's processing of another packet in the same packet flow, so that only one or a small number of packets of a flow may be sent to an application node for processing. This may be particularly useful when an application node is performing a classification operation (e.g., for QoS, or even virus or intrusion protection), that after such classification operation is determined for the flow of packets (e.g., based on a subset of the flow of packets), the other packets in the flow of packets are not sent to an application node for processing as how to process these packets has been determined. Thus, the packet classification mechanism may be updated to stop sending packets of the packet flow to an application node.

As identified in process block 305, if the packet should not be sent to an application node, then in process block 306, normal local processing of the packet is performed (e.g., QoS processing, apply one or more features, forward or drop, etc.), possibly based on a result from processing by an application node of one or more packets in a same packet flow.

Otherwise processing proceeds to process block 310, as process block 305 identified that the packet is to be sent to an application node for applying one or more classifications of Layer-4 to Layer-7 services by one or more application nodes to the packet to determine a result. Note, the use of the phrase "applying one or more services to the packet" includes a series of applications applied to the packet, with the packet possibly being modified between the application of some of these services such that one or more of the services is applied to a modified original packet. Further, examples of these Layer-4 to Layer-7 services include, but are not limited to, Firewall (FW), Network Address Translation (NAT), Network-based Application Recognition (NBAR), deep packet inspection (DPI), authentication, encryption, and Internet Protocol Security (IPsec).

In process block 310, any parameters (e.g., VPN identification, specialized service parameters, label stacks, etc.) are acquired, and the request packet is created. The request packet includes the original packet, and possibly other ServiceWire attributes, such as, but not limited to: an identification of one or more services to be applied to the packet, an identification of a virtual private network (VPN) associated with the packet (e.g., a VPN associated with an interface on which the packet was received), etc. In one embodiment, the service identification is a single value, for example, indicating to perform QoS classification on the packet. In one embodiment, the service identification includes the identification of a generalized service (e.g., Firewall) and a specific service of the generalized service (e.g., inside-to-outside, outside-to-inside). Next, in process block 312, the request packet (e.g., a ServiceWire packet encapsulating the original packet) is sent to an application node. Note, in one embodiment, processing proceeds to process block 319 instead of to process block 314 (not shown) as no result packet is received by the sending service node (e.g., an application node may drop the packet, or forward it to another service or application node, packet switching device, or customer device other than the original service node).

In process block 314, a response packet, corresponding to the sent request packet, is received, with the response packet including a result of the application of one or more services and/or the services-applied packet. In one embodiment, this result is a classification result based on one or more classification operations performed on the original packet. Additionally, typically the result packet also encapsulates the services-applied packet corresponding to the original packet (i.e., the result of one or more services being applied to the original packet by one or more application nodes). In process block 316, the service node processes the services-applied packet, possibly based on the result (e.g., classification result such as a QoS indication for processing one or more packets of a flow of packets), if included in the response packet. Examples of such processing include, but are not limited to: the service node applies QoS to one or more packets of a flow of packets, the service node applies one or more additional services to the services-applied packet; the service node forwards or drops the services-applied packet; the service node performs a lookup operation in the corresponding forwarding information for the VPN identified in the response packet from multiple sets of forwarding information maintained for different VPNs; repeat the process illustrated in FIG. 3A by returning to process block 304, etc. Additionally, as discussed supra, the classification mechanism (e.g., the processing by process block 305) might be updated to no longer send packets of a same packet flow to an application node. Processing of the flow diagram of FIG. 3A is complete as represented by process block 319.

Figure 3B:
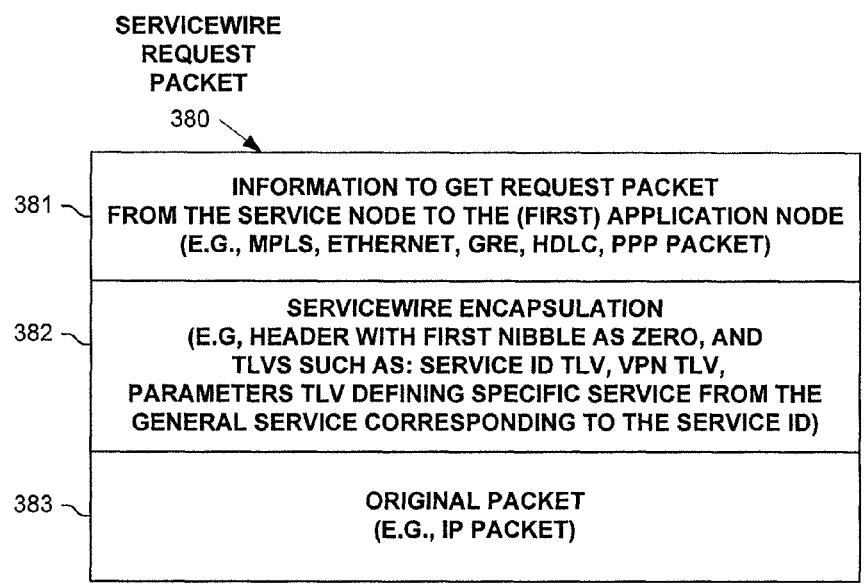
FIG. 3B illustrates a packet format used in one embodiment.

Next, FIG. 3B illustrates a ServiceWire request packet (380) used in one embodiment. As shown, request packet 380 encapsulates original packet 383, which is to have one or more services applied to it by one or more application nodes. In one embodiment, request packet 380 comprises one or more fields 381, which includes information to get the request packet from the service node to the first application node of one or more application nodes. The format of request packet 380 may be in one of an extensible number of formats, such as, but not limited to, MPLS, Ethernet, GRE, HDLC, PPP, etc., with one or more fields 381 conforming to the particular packet format. ServiceWire encapsulation 382 includes information required for defining the one or more applications to be applied to original packet 383, as well as possibly additional information (e.g., VPN information to be returned to the service node so it can properly forward a packet). In one embodiment such as when field 381 includes an MPLS label stack, field 382 has its first nibble as zero to identify ServiceWire encapsulation follows, when normally the first nibble would be four or six to identify an IPv4 or IPv6 packet is encapsulated. In one embodiment, ServiceWire encapsulation 382 encodes the ServiceWire information (e.g., identification of a service, identification of general and specific services, VPN information, etc.) in one or more Type-Length-Value (TLV) structures.

Figure 4A:
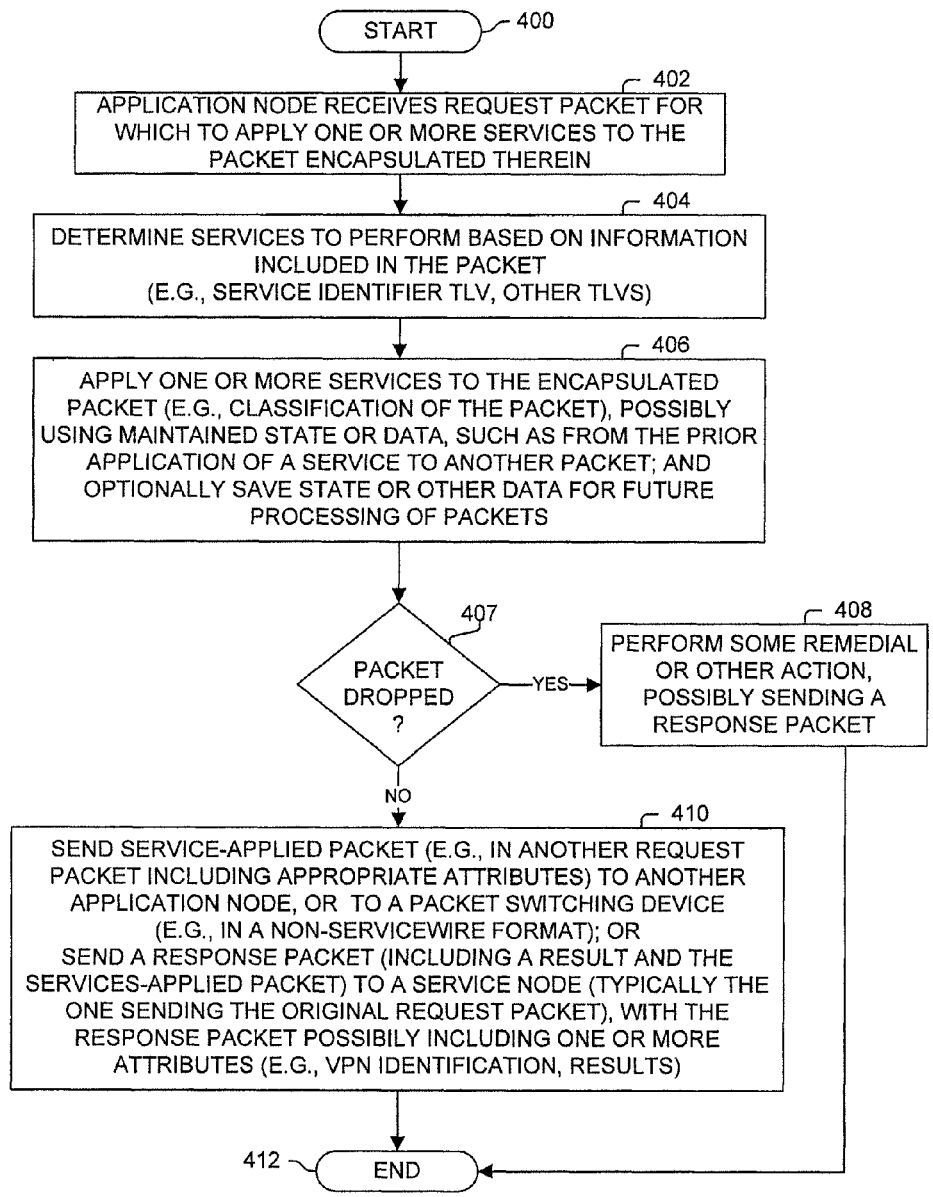
FIG. 4A illustrates a process performed in one embodiment.

FIG. 4A illustrates a process performed, in one embodiment, by an application node for processing a request packet received from a service or application node. Processing begins with process block 400. In process block 402, the application node receives the request packet for which to apply one or more services to the packet encapsulated therein. Typically, the application node is remote from the service node (e.g., communicatively coupled via a network external to the service and application nodes). In one embodiment, the service and application nodes are within a same packet switching appliance, such as with the application node being a blade server or service blade. Next, in process block 404, the application node identifies, based on information included in the request packet (e.g., in the ServiceWire encapsulation) one or more services to apply to the encapsulated packet.

In process block 406, the application node applies one or more of the identified service(s) to the encapsulated packet. In one embodiment, these services include a classification service such as using deep packet inspection of the encapsulated packet, generating a classification result which can be used in processing the packet and possibly other packets in the same flow of packets. For example, this classification result might identify a QoS level for processing packets in the flow of packets, or it might identify that the flow of packets should be dropped (e.g., they are malicious in nature).

Additionally, in one embodiment, resulting state information or other data from the application of a service to a packet of a packet flow may be maintained by an application node, such as for use in applying a service to other packets especially those of a same packet flow, or for collecting data or statistics, etc. For example, in analyzing a flow of packets (e.g., applying a deep packet inspection service), certain signature or other data may be split among multiple packets of the packet flow. Thus, to appropriately classify the flow, an analysis/classification service is applied to multiple packets of the flow, with the particular classification of the packet flow not known until the last of these multiple packets have been analyzed. In one embodiment, a service or an application node uses this particular classification to process other packets in the packet flow. Note, these packets, after having one or more services applied to them, can be sent to another application node, to a service node, or dropped.

As determined in process block 407, if the packet was dropped, then in process block 408, some remedial or other action is typically taken, which may include sending a response packet to the service node, such that the service node can update its classification mechanism to no longer forward packets of the corresponding packet flow to an application node, and to update its processing of other packets of the corresponding packet flow (e.g., drop or mark for dropping, or other processing).

Otherwise, in process block 410, the services-applied packet (e.g., the original packet or a modification thereof based on the application of one or more services) is sent in a request packet to another application node to apply one or more services; the services-applied packet is sent in a non-ServiceWire format to another packet switching device towards its destination, or the services-applied packet possibly along with a result (e.g., classification or other processing result) is sent in a response packet back to the originating service node. For example, one application node can apply one or more services (e.g., including deep packet inspection) to a packet, with the packet and these results sent to another application node for applying one or more services. The response packet may include one or more attributes or other information, such as, but not limited to, a classification or processing result and/or an identification of a VPN associated with the services-applied packet (e.g., the same or different identifier identifying a VPN in the ServiceWire or other encapsulation of the received request packet). Processing of the flow diagram of FIG. 4A is complete as indicated by process block 412.

Figure 4B:
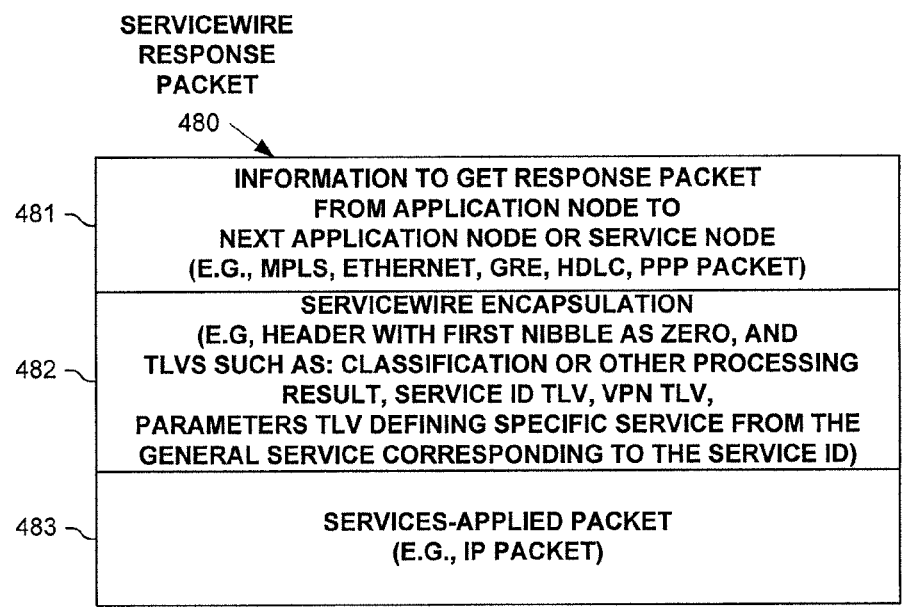
FIG. 4B illustrates a packet format used in one embodiment.

Next, FIG. 4B illustrates a ServiceWire response packet (480) used in one embodiment. As shown, response packet 480 encapsulates the services-applied packet 483, which is the original packet after having the one or more services applied to it by one or more application nodes. Thus, services-applied packet 483 packet can be the original packet, or a modification thereof resulting from the application of these services.

In one embodiment, response packet 480 comprises one or more fields 481, which includes information to get the response packet from the application node to the service node. The format of response packet 480 may be in one of an extensible number of formats, such as, but not limited to, MPLS, Ethernet, GRE, HDLC, PPP, etc., with one or more fields 481 conforming to the particular packet format. ServiceWire encapsulation 482 includes information for use by the service node in processing encapsulated services-applied packet 483 and/or other packets in a same packet flow (e.g., classification or other processing result, VPN information so the service node can properly forward services-applied packet 483). In one embodiment such as when field 481 includes an MPLS label stack, field 482 has its first nibble as zero to identify ServiceWire encapsulation follows, when normally the first nibble would be four or six to identify an IPv4 or IPv6 packet is encapsulated. In one embodiment, ServiceWire encapsulation 482 encodes the ServiceWire information (e.g., identification of a service, identification of general and specific services, VPN information, etc.) in one or more Type-Length-Value (TLV) structures.

In view of the many possible embodiments to which the principles of our invention may be applied, it will be appreciated that the embodiments and aspects thereof described herein with respect to the drawings/figures are only illustrative and should not be taken as limiting the scope of the invention. For example, and as would be apparent to one skilled in the art, many of the process block operations can be re-ordered to be performed before, after, or substantially concurrent with other operations. Also, many different forms of data structures could be used in various embodiments. The invention as described herein contemplates all such embodiments as may come within the scope of the following claims and equivalents thereof.

What is claimed is:

1. A method, comprising:
    advertising via a link state routing protocol, by an application node, a packet-processing service that the application node is configured to perform, with an identification of the packet-processing service being included in packets of the link state routing protocol in an Opaque Link State Advertisement (LSA), Transport Instance, or GENINFO type-length-value element (TLV) including packet-processing service-specific information identifying the packet-processing service;
    receiving, by a packet switching device, one or more packets including advertisement of Internet Protocol routes and information being distributed via the link state routing protocol, with said one or more packets including an advertisement that the packet-processing service is available from the application node included in an Opaque Link State Advertisement (LSA), Transport Instance, or GENINFO type-length-value element (TLV) including packet-processing service-specific information identifying the packet-processing service;
    receiving an original packet,
    determining to apply the packet-processing service to the original packet;
    selecting the application node to apply the packet-processing service to the original packet based on the advertisement that the packet-processing service is available from the application node;
    sending, by the packet switching device, a request packet to the application node requesting the application of the packet-processing service to the original packet, with the original packet being servicewire encapsulated in the request packet, and with the request packet including a servicewire header;
    applying, by the application node, the packet-processing service to the original packet; and
    sending, by the application node to the packet switching device, a servicewire response packet responsive to the packet-processing service said applied by the application node to the original packet, with the servicewire response packet including an encapsulation of the original packet or a modified version of the original packet resulting from the packet-processing service said applied by the application node to the original packet, and with the servicewire response packet including a servicewire header;
    wherein the packet-processing service includes at least one application from a group of applications consisting of: Firewall (FW), Network Address Translation (NAT), Network-based Application Recognition (NBAR), deep packet inspection (DPI), authentication, encryption, and Internet Protocol Security (IPsec).

2. The method of claim 1, wherein the routing protocol is an Interior Gateway Protocol (IGP).

3. The method of claim 2, wherein the IGP is Intermediate System to Intermediate System (IS-IS).

4. The method of claim 3, wherein said one or more packets include the advertisement in a GENINFO type-length-value element (TLV).

5. The method of claim 2, wherein the IGP is Open Shortest Path First (OSPF).

6. The method of claim 5, wherein said one or more packets include the advertisement in an Opaque Link State Advertisement (LSA) or Transport Instance.

7. The method of claim 1, wherein the request packet includes a service identifier; wherein the application node uses the service identifier to determine to apply the packet-processing service to the original packet.

8. The method of claim 7, wherein the advertisement that the packet-processing service is available from the application node includes an identification of the service identifier.

9. The method of claim 8, wherein the service identifier is assigned by the application node.

10. The method of claim 1, wherein said advertising by the application node includes an identification of one or more supported transport types for the packet-processing service; and wherein the packet switching device, in response to said identified supported transport types, said sends the request packet via one of said identified supported transport types.

11. The method of claim 1, wherein the packet switching device said receives said one or more packets including information being distributed via the routing protocol from a second packet switching device different from the packet switching device and the application node.

12. The method of claim 1, wherein the application node is external to the packet switching device.

13. The method of claim 1, wherein the application node is a service blade or a blade server within the packet switching device.

14. The method of claim 1, wherein the packet-processing service is Firewall (FW).

15. The method of claim 1, wherein the packet-processing service is Network Address Translation (NAT).

16. The method of claim 1, wherein the packet-processing service is Network-based Application Recognition (NBAR).

17. The method of claim 1, wherein the packet-processing service is deep packet inspection (DPI).

18. The method of claim 1, wherein the packet-processing service is Internet Protocol Security (IPsec).

19. A method, comprising:
receiving, by a packet switching device, one or more link state routing protocol packets including advertisement of Internet Protocol routes and information being distributed via a corresponding link state routing protocol, with said one or more link state routing protocol packets including an advertisement that a packet-processing service is available from an application node of one or more application nodes, with an identification of the packet-processing service being included said one or more link state routing protocol packets in an Opaque Link State Advertisement (LSA), Transport Instance, or GEN-INFO type-length-value element (TLV) including packet-processing service-specific information identifying the packet-processing service;
receiving an original packet,
determining to apply the packet-processing service to the original packet;
selecting, by the packet switching device, the application node to apply the packet-processing service based on said received advertisement that the packet-processing service was available from the application node in one or more of said received routing protocol packets;
sending, by the packet switching device, a request packet to said selected application node requesting application of the packet-processing service to the original packet, with the original packet being servicewire encapsulated in the request packet, and with the request packet including a servicewire header; and
receiving, by the packet switching device, a servicewire response packet responsive to said request to apply the packet-processing service to the original packet, with the servicewire response packet including an encapsulation of the original packet or a modified version of the original packet resulting from the packet-processing service said applied by the application node to the original packet, and with the servicewire response packet including a servicewire header;
wherein the packet-processing service includes at least one application from a group of applications consisting of: Firewall (FW), Network Address Translation (NAT), Network-based Application Recognition (NBAR), deep packet inspection (DPI), authentication, encryption, and Internet Protocol Security (IPsec).

20. The method of claim 19, wherein the link state routing protocol is an Interior Gateway Protocol (IGP).

21. The method of claim 19, wherein the advertisement includes an identification of one or more supported transport types for the packet-processing service; and wherein the packet switching device, in response to said identified supported transport types, said sends the request packet via one of said identified supported transport types.

22. The method of claim 19, wherein the packet-processing service is Firewall (FW).

23. The method of claim 19, wherein the packet-processing service is Network Address Translation (NAT).

24. The method of claim 19, wherein the packet-processing service is Network-based Application Recognition (NBAR).

25. The method of claim 19, wherein the packet-processing service is deep packet inspection (DPI).

26. The method of claim 19, wherein the packet-processing service is Internet Protocol Security (IPsec).

27. A method, comprising:
advertising via a link state routing protocol, by an application node, a plurality of Internet Protocol routes and a packet-processing service that the application node is configured to perform, with an identification of the packet-processing service being included in packets of the link state routing protocol in an Opaque Link State Advertisement (LSA), Transport Instance, or GEN-INFO type-length-value element (TLV) including packet-processing service-specific information identifying the packet-processing service;
receiving, by the application node, a request packet to the application node requesting the application of the packet-processing service to an original packet, with the original packet being servicewire encapsulated in the request packet, and with the request packet including a servicewire header;
applying, by the application node, the packet-processing service to the particular original packet; and
sending, by the application node to the packet switching device, a servicewire response packet responsive to the packet-processing service said applied by the application node to the original packet, with the servicewire response packet including an encapsulation of the original packet or a modified version of the original packet resulting from the packet-processing service said applied by the application node to the original packet, and with the servicewire response packet including a servicewire header;
wherein the packet-processing service includes at least one application from a group of applications consisting of: Firewall (FW), Network Address Translation (NAT), Network-based Application Recognition (NBAR), deep packet inspection (DPI), authentication, encryption, and Internet Protocol Security (IPsec).

28. The method of claim 27, wherein the routing protocol is an Interior Gateway Protocol (IGP).

29. A packet switching device, comprising:
a plurality of interfaces configured to send and receive packets, including being configured to receive: one or more link state routing protocol packets including advertisement of routes and information being distributed via a corresponding link state routing protocol, with said one or more link state routing protocol packets including an advertisement that a packet-processing service is available from an application node; and a particular packet, with an identification of the packet-processing service being included said one or more link state routing protocol packets in an Opaque Link State Advertisement (LSA), Transport Instance, or GENINFO type-length-value element (TLV) including packet-processing service-specific information identifying the packet-processing service, and being configured to receive an original packet; and one or more processing elements configured to: identify to forward the particular packet to the application node based on said received advertisement that the packet-processing service was available from the application node in one or more of said received routing protocol packets; and create a request packet requesting application of the packet-processing service to the original packet, with the original packet being servicewire encapsulated in the request packet, and with the request packet including a servicewire header; and wherein the packet switching device is configured to send the request packet to the application node to apply the packet-processing service to the original packet, and configured to receive a servicewire response packet responsive to said request to apply the packet-processing service to the original packet, with the servicewire response packet including an encapsulation of the original packet or a modified version of the original packet resulting from the packet-processing service said applied by the application node to the original packet, and with the servicewire response packet including a servicewire header;

wherein the packet-processing service includes at least one application from a group of applications consisting of: Firewall (FW), Network Address Translation (NAT), Network-based Application Recognition (NBAR), deep packet inspection (DPI), authentication, encryption, and Internet Protocol Security (IPsec).

30. The packet switching device of claim 29, wherein the link state routing protocol is an Interior Gateway Protocol (IGP).

\* \* \* \* \*

UNITED STATES PATENT AND TRADEMARK OFFICE
CERTIFICATE OF CORRECTION

PATENT NO.         : 9,049,098 B2                                          Page 1 of 1
APPLICATION NO.    : 12/850841
DATED              : June 2, 2015
INVENTOR(S)        : Guichard et al.

It is certified that error appears in the above-identified patent and that said Letters Patent is hereby corrected as shown below:

In the Specification

Col. 4, line 24, "teem" should be – term –

Col. 7, line 55, "size of (fixed fields)" should be – sizeof(fixedfields) –

In the Claims

Col. 14, Claim 27, line 19, "the particular original" should be – the original –

Signed and Sealed this
Second Day of February, 2016

Michelle K. Lee
*Director of the United States Patent and Trademark Office*